United States Patent
Choi et al.

(10) Patent No.: US 11,270,187 B2
(45) Date of Patent: Mar. 8, 2022

(54) METHOD AND APPARATUS FOR LEARNING LOW-PRECISION NEURAL NETWORK THAT COMBINES WEIGHT QUANTIZATION AND ACTIVATION QUANTIZATION

(71) Applicant: Samsung Electronics Co., Ltd., Gyeonggi-do (KR)

(72) Inventors: Yoo Jin Choi, San Diego, CA (US); Mostafa El-Khamy, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 1037 days.

(21) Appl. No.: 15/914,229

(22) Filed: Mar. 7, 2018

(65) Prior Publication Data

US 2019/0138882 A1   May 9, 2019

Related U.S. Application Data

(60) Provisional application No. 62/583,390, filed on Nov. 8, 2017, provisional application No. 62/582,848, filed on Nov. 7, 2017.

(51) Int. Cl.
   *G06N 3/04* (2006.01)
   *G06N 3/08* (2006.01)

(52) U.S. Cl.
   CPC .............. *G06N 3/04* (2013.01); *G06N 3/08* (2013.01)

(58) Field of Classification Search
   CPC ................................ G06N 3/04; G06N 3/08
   See application file for complete search history.

(56) References Cited

U.S. PATENT DOCUMENTS

2014/0073892 A1* 3/2014 Randloev ............. A61B 5/7275
                                                               600/365
2016/0086078 A1    3/2016 Ji et al.
(Continued)

FOREIGN PATENT DOCUMENTS

CN    105512289    4/2016
CN    107133919    9/2017

OTHER PUBLICATIONS

Han et al. "Deep compression: Compressing deep neural networks with pruning, trained quantization and huffman coding." arXiv preprint arXiv:1510.00149 (2015). (Year: 2015).*

(Continued)

*Primary Examiner* — Kakali Chaki
*Assistant Examiner* — Asher Jablon
(74) *Attorney, Agent, or Firm* — The Farrell Law Firm, P.C.

(57) ABSTRACT

A method is provided. The method includes selecting a neural network model, wherein the neural network model includes a plurality of layers, and wherein each of the plurality of layers includes weights and activations; modifying the neural network model by inserting a plurality of quantization layers within the neural network model; associating a cost function with the modified neural network model, wherein the cost function includes a first coefficient corresponding to a first regularization term, and wherein an initial value of the first coefficient is pre-defined; and training the modified neural network model to generate quantized weights for a layer by increasing the first coefficient until all weights are quantized and the first coefficient satisfies a pre-defined threshold, further including optimizing a weight scaling factor for the quantized weights and an activation scaling factor for quantized activations, and wherein the (Continued)

quantized weights are quantized using the optimized weight scaling factor.

21 Claims, 3 Drawing Sheets

(56) References Cited

U.S. PATENT DOCUMENTS

| | | | |
|---|---|---|---|
| 2016/0328646 A1 | 11/2016 | Lin et al. | |
| 2016/0328647 A1 | 11/2016 | Lin et al. | |
| 2017/0154632 A1* | 6/2017 | Sung | G10L 19/038 |
| 2017/0286830 A1* | 10/2017 | El-Yaniv | G06N 3/0481 |
| 2018/0349758 A1* | 12/2018 | Pan | G06N 3/0454 |

OTHER PUBLICATIONS

Li et al. "Deep Feature Selection: Theory and Application to Identify Enhancers and Promoters". Journal of Computational Biology, vol. 23, No. 5. May 2016. 322-336. (Year: 2016).*

Vanhoucke et al. "Improving the speed of neural networks on CPUs." Jul. 13, 2012. Wayback Machine. Accessed Feb. 16, 2021. https://web.archive.org/web/20120713232604/http:/www.andrewsenior.com/papers/VanhouckeNIPS11.pdf (Year: 2012).*

Loroch et al. "Tensorquant: A simulation toolbox for deep neural network quantization." Oct. 13, 2017. arXiv preprint arXiv: 1710.05758v1 (2017). (Year: 2017).*

Ristretto: Layers, Benchmarking and Finetuning, Laboratory for Embedded and Programmable Systems, Leps—University of California Davis, Oct. 20, 2016, 4 pages.

A. Krizhevsky et al., "ImageNet classification with deep convolutional neural networks," in Advances in Neural Information Processing Systems, 2012, 9 pages.

C. Szegedy et al., "Going deeper with convolutions," in Proceedings of the IEEE Conference on Computer Vision and Pattern Recognition, 2015, 9 pages.

R. Girshick et al., "Rich feature hierarchies for accurate object detection and semantic segmentation," in Proceedings of the IEEE Conference on Computer Vision and Pattern Recognition, 2014, 11 pages.

R. Girshick, "Fast R-CNN," in Proceedings of the IEEE International Conference on Computer Vision, 2015, 9 pages.

S. Ren, et al., "Faster R-CNN: Towards real-time object detection with region proposal networks," in Advances in neural information processing systems, 2015, 143 pages.

J. Long et al., "Fully convolutional networks for semantic segmentation," in Proceedings of the IEEE Conference on Computer Vision and Pattern Recognition, 2015, 10 pages.

C. Dong et al., "Image super-resolution using deep convolutional networks," IEEE transactions on pattern analysis and machine intelligence, vol. 38, No. 2, 2016, 14 pages.

V. Vanhoucke et al., "Improving the speed of neural networks on CPUs," in Deep Learning and Unsupervised Feature Learning Workshop, NIPS, 2011, 8 pages.

S. Anwar et al., "Fixed point optimization of deep convolutional neural networks for object recognition," in IEEE International Conference on Acoustics, Speech and Signal Processing, 2015, 5 pages.

S. Gupta et al., "Deep learning with limited numerical precision," in Proceedings of the 32nd International Conference on Machine Learning, 2015, 10 pages.

M. Courbariaux et al., "BinaryConnect: Training deep neural networks with binary weights during propagations," in Advances in Neural Information Processing Systems, 2015, 9 pages.

Y. LeCun et al., "Gradient-based learning applied to document recognition," Proceedings of the IEEE, vol. 86, No. 11, Nov. 1998, 46 pages.

C. M. Bishop. Pattern Recognition and Machine Learning. Springer, 2006, 9 pages.

Z. Cheng, et al. "Training Binary Multilayer Neural Networks for Image Classification using Expectation Backpropagation", Mar. 12, 2015, 3 pages.

Y. Gong et al., "Compressing deep convolutional networks using vector quantization," 2014, 10 pages.

S. Han et al., "Learning both weights and connections for efficient neural networks," In Advances in Neural Information Processing Systems, 2015, 9 pages.

M. Hohfeld et al., "Probabilistic rounding in neural network learning with limited precision," Neurocomputing 4, 1992, 9 pages.

S. J. Nowlan et al., "Simplifying neural networks by soft weight-sharing," Neural computation 4, 1992, 21 pages.

O. Russakovsky et al., "ImageNet large scale visual recognition challenge," International Journal of Computer Vision 115(3), 2015, 43 pages.

D. Soudry et al., "Expectation backpropagation: Parameter-free training of multilayer neural networks with continuous or discrete weights," In Advances in Neural Information Processing Systems, 2014, 9 pages.

K. Simonyan et al., "Very deep convolutional networks for large-scale image recognition," arXiv:1409.1556v6 [cs.CV] Apr. 10, 2015, 14 pages.

K. He et al., "Deep residual learning for image recognition," arXiv:1512.03385v1 [cs.CV] Dec. 10, 2015, 12 pages.

P. Sermanet et al., "Overfeat: Integrated recognition, localization and detection using convolutional networks," arXiv:1312.6229v4 [cs.CV] Feb. 24, 2014, 16 pages.

L.-C. Chen et al., "DeepLab: Semantic image segmentation with deep convolutional nets, atrous convolution, and fully connected crfs," arXiv:1606.00915v2 [cs.CV] May 12, 2017, 14 pages.

H. Noh et al., "Learning deconvolution network for semantic segmentation," arXiv:1505.04366v1 [cs.CV] May 17, 2015, 10 pages.

C. Dong et al., "Accelerating the super-resolution convolutional neural network," arXiv:1608.00367v1 [cs.CV] Aug. 1, 2016, 17 pages.

C. Ledig et al., "Photo-realistic single image super-resolution using a generative adversarial network," arXiv:1609.04802v5 [cs.CV] May 25, 2017, 19 pages.

M. Courbariaux et al., "Training deep neural networks with low precision multiplications," arXiv:1412.7024v5 [cs.LG] Sep. 23, 2015, 10 pages.

D. D. Lin et al., "Fixed point quantization of deep convolutional networks," arXiv:1511.06393v3 [cs.LG] Jun. 2, 2016, 10 pages.

Z. Lin et al., "Neural networks with few multiplications," arXiv:1510.03009v1 [cs.LG] Oct. 11, 2015, 7 pages.

M. Rastegari et al., "XNOR-Net: ImageNet classification using binary convolutional neural networks," arXiv:1603.05279v4 [cs.CV] Aug. 2, 2016, 17 pages.

K. Ullrich et al., "Soft weight-sharing for neural network compression," arXiv:1702.04008v2 [stat.ML] May 9, 2017, 16 pages.

P. Gysel, "Ristretto: Hardware-oriented Approximation of Convolutional Neural Networks," arXiv:1605.06402v1 [cs.CV] May 20, 2016, 73 pages.

https://github.com/KarenUllrich/Tutorial-SoftWeightSharingForNNCompression/, © 2021 GitHub, Inc, May 16, 2018, 2 pages.

F. N. Iandola et al., "SqueezeNet: AlexNet-Level Accuracy with 50x Fewer Parameters and <0.5MB Model Size," arXiv:1602.07360v4 [cs.CV] Nov. 4, 2016, 13 pages.

H. Ren et al., "Image super resolution based on fusing multiple convolution neural networks," 2017 IEEE Conference on Computer Vision and Pattern Recognition Workshops (CVPRW), 2017, pp. 1050-1057.

Y. Bengio et al., "Estimating or propagating gradients through stochastic neurons for conditional computation," arXiv.1308.3432v1 [cs.LG] Aug. 15, 2013, 12 pages.

Z. Cai et al., "Deep learning with low precision by half-wave gaussian quantization," arXiv:1702.00953v1 [cs.CV] Feb. 3, 2017, 10 pages.

L.-C. Chen et al., "Semantic image segmentation with deep convolutional nets and fully connected CRFs," arXiv:14127062v4 [cs.CV] Jun. 7, 2016, 14 pages.

(56) References Cited

OTHER PUBLICATIONS

X. Chen et al., "FxpNet: Training deep convolutional neural network in fixed-point representation," International Joint Conference on Neural Networks (IJCNN 2017), May 2017, 8 pages.

Y. Choi et al., "Towards the limit of network quantization," arXiv:1612.01543v2 [cs.CV] Nov. 13, 2017, 14 pages.

Y. Guo et al., "Dynamic network surgery for efficient DNNs," arXiv:1608.04493v2 [cs.NE] Nov. 10, 2016, 9 pages.

L. Hou et al., "Loss-aware binarization of deep networks," arXiv:1611.01600v3 [cs.NE] May 10, 2018, 11 pages.

G. Huang et al., "Densely connected convolutional networks," arXiv:1608.06993v5 [cs.CV] Jan. 28, 2018, 9 pages.

I. Hubara et al., "Binarized neural networks," NIPS'16: Proceedings of the 30th International Conference on Neural Information Processing Systems, Dec. 2016, pp. 4114-4122.

I. Hubara et al., "Quantized neural networks: Training neural networks with low precision weights and activations," arXiv:1609.07061v1 [cs.NE] Sep. 22, 2016, 29 pages.

Wu et al., SqueezeDet: Unified, Small, Low Power Fully Convolutional Neural Networks for Real-Time Object Detection for Autonomous Driving, arXiv:1612.01051v3 [cs.CV] Nov. 29, 2017, 12 pages.

V. Lebedev et al., "Fast ConvNets using groupwise brain damage," arXiv:1506.02515v2 [cs.CV] Dec. 7, 2015, 10 pages.

B. Lim et al., "Enhanced deep residual networks for single image super-resolution," arXiv:1707.02921 v1 [cs.CV] Jul. 10, 2017, 9 pages.

W. Wen et al., "Learning structured sparsity in deep neural networks," arXiv:1608.03665v4 [cs.NE] Oct. 18, 2016, 9 pages.

X. Zhang et al., "Polynet: A pursuit of structural diversity in very deep networks," arXiv:1611.05725v2 [cs.CV] Jul. 17, 2017, 9 pages.

A. Zhou et al., "Incremental network quantization: Towards lossless CNNs with low-precision weights," arXiv:1702.03044v2 [cs.CV] Aug. 25, 2017, 14 pages.

S. Zhou et al., "DoReFa-Net: Training low bitwidth convolutional neural networks with low bitwidth gradients," arXiv:1606.06160v3 [cs.NE] Feb. 2, 2018, 13 pages.

C. Zhu et al., "Trained ternary quantization," arXiv: 1612.01064v3 [cs.LG] Feb. 23, 2017, 10 pages.

\* cited by examiner

METHOD AND APPARATUS FOR LEARNING LOW-PRECISION NEURAL NETWORK THAT COMBINES WEIGHT QUANTIZATION AND ACTIVATION QUANTIZATION

PRIORITY

This application claims priority under 35 U.S.C. § 119(e) to U.S. Provisional Patent Applications filed on Nov. 7, 2017 and Nov. 8, 2017 in the U.S. Patent and Trademark Office and assigned Ser. Nos. 62/582,848 and 62/583,390, respectively, the entire contents of each of which are incorporated herein by reference.

FIELD

The present disclosure relates generally to neural networks, and more particularly, to a method and apparatus for learning low-precision neural networks that combines weight quantization and activation quantization.

BACKGROUND

Deep neural networks have recently achieved major performance breakthroughs in many computer vision tasks, e.g., image classification, object detection, semantic segmentation, and super resolution. The performance of state-of-the-art neural networks is due to very deep and over-parameterized multi-layer architectures. Currently, millions or tens of millions of parameters in more than one hundred layers are typical. However, the increasing number of network parameters in a large number of layers requires high-performance vector computing processors such as a graphics processing unit (GPU) equipped with a large amount of memory. Moreover, the need for computing power and memory resources grows quickly, as high-resolution images and videos of increasing sizes are processed.

Low-precision implementation of deep neural networks is of great interest recently, particularly for deployment of deep neural networks on resource-limited devices, e.g., battery-powered mobile or portable devices. In such platforms, memory and power are limited. Furthermore, basic floating-point arithmetic operations may not be supported. Low-precision weights (e.g., parameters) and activations (e.g., feature maps) reduce computational costs and lower memory requirements. Hence, low-precision weights and activations are preferred and sometimes necessary for efficient processing with reduced power consumption when computation and power budgets are limited. Memory burden may be curtailed as well using low-precision weights and activations of smaller bit widths instead of full-precision values of larger bit widths.

SUMMARY

According to one embodiment, a method includes selecting a neural network model, wherein the neural network model includes a plurality of layers, and wherein each of the plurality of layers includes weights and activations; modifying the neural network model by inserting a plurality of quantization layers within the neural network model; associating a cost function with the modified neural network model, wherein the cost function includes a first coefficient corresponding to a first regularization term, and wherein an initial value of the first coefficient is pre-defined; and training the modified neural network model to generate quantized weights for a layer by increasing the first coefficient until all weights are quantized and the first coefficient satisfies a pre-defined threshold, further including optimizing a weight scaling factor for the quantized weights and an activation scaling factor for quantized activations, and wherein the quantized weights are quantized using the optimized weight scaling factor.

According to one embodiment, an apparatus includes a selector configured to select a neural network model, wherein the neural network model includes a plurality of layers, and wherein each of the plurality of layers includes weights and activations; an insertion device configured to modify the neural network model by inserting a plurality of quantization layers within the neural network model; an association device configured to associate a cost function with the modified neural network model, wherein the cost function includes a first coefficient corresponding to a first regularization term, and wherein an initial value of the first coefficient is pre-defined; and a training device configured to train the modified neural network model to generate quantized weights for a layer by increasing the first coefficient until all weights are quantized and the first coefficient satisfies a pre-defined threshold, and optimize a weight scaling factor for the quantized weights and an activation scaling factor for quantized activations, wherein the quantized weights are quantized using the optimized weight scaling factor.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
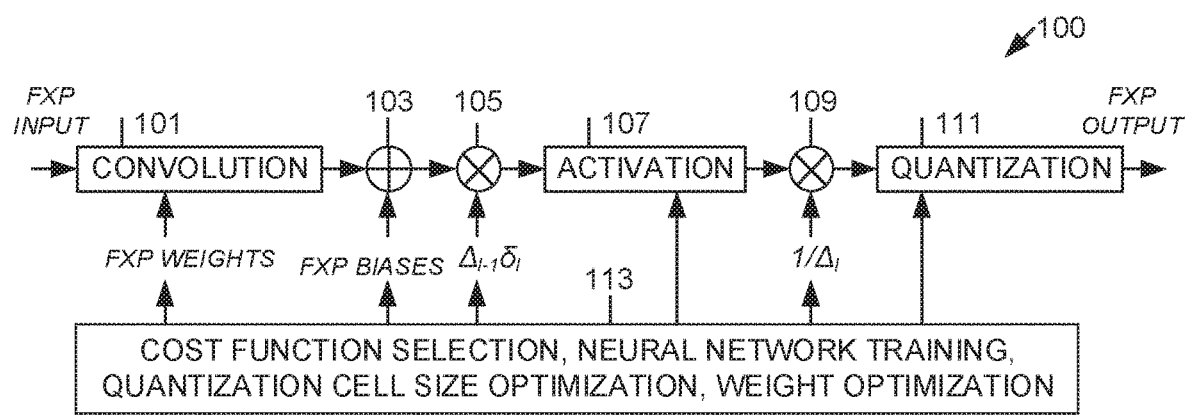
FIG. 1 illustrates an exemplary flow diagram of a method of a low-precision convolutional layer for a general non-linear activation function that combines weight quantization and activation quantization, according to an embodiment of the present disclosure.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

According to one embodiment, the present system and method obtains low-precision neural networks having quantized weights and quantized activations (e.g., feature maps). Quantized weights and quantized activations are represented by fixed-point numbers of low-precision (e.g., lower bit width). Common scaling factors are defined in each layer of a neural network for weights and activations, respectively, to cover their dynamic ranges that vary every layer. The present system and method provides weight quantization and activation quantization.

For weight quantization, the present system trains neural networks with a regularization coefficient of a mean square quantization error (MSQE) for weights in each layer of a neural network. According to one embodiment, a regularization coefficient is a learnable parameter. Initially, the regularization coefficient may be set to be small and a high-precision (e.g., greater bit width) model is trained. As training continues, the present system increases the regularization coefficient gradually such that the regularization coefficient forces weights to be increasingly quantized. The present system completes network training when the regularization coefficient becomes sufficiently large such that the trained model, which began as a high-precision model, converges to a low-precision model having only quantized weights. During training, a scaling factor for weights in each layer is learnable as well such that the present system optimizes the scaling factor to minimize the MSQE.

For activation (e.g., feature map) quantization, the present system includes quantization layers. A quantization layer is a non-linear layer that outputs quantized values of an input. Similar to weight quantization, a learnable scaling factor for activations is defined in each layer and optimized during training. The MSQE for activations in each layer is minimized for optimization. Quantization layers generate quantized activations during training and weights are optimized based on quantized activations. In contrast, weights are not quantized during training iterations, but each weight gradually converges to a quantized value as training proceeds because of the MSQE regularization with an increasing regularization coefficient.

By combining weight quantization and activation quantization processes, the present system provides a unified training method for learning low-precision neural networks. The present system and method further provides regularizing power-of-two scaling factors for weights and activations that may be applied in addition to the present training process for low-precision neural networks, according to one embodiment. A power-of-two scaling may be computationally advantageous when it is implemented by bit-shift rather than scalar multiplication.

According to one embodiment, the present system concerns a low-precision neural network having quantized weights and quantized activations (e.g., feature maps). Quantized weights and quantized activations in each layer are represented by low-precision fixed-point numbers of similar bit widths, respectively. Common scaling factors for weights and activations are additionally defined in each layer of a neural network, respectively, in order to cover their dynamic ranges that vary every layer. The scaling factor is the quantization cell size, which is fixed for linear quantization.

Low-precision neural networks may be implemented by low-precision fixed-point arithmetic operations.

FIG. 1 illustrates an exemplary flow diagram of a method of a low-precision convolutional layer 100 for a general non-linear activation function that combines weight quantization and activation quantization, according to an embodiment of the present disclosure.

Referring to FIG. 1, a fixed-point design of the low-precision convolutional layer 100 includes a convolution operation 101, a bias addition operation 103, a first scale-factor multiplication operation 105, a non-linear activation operation 107, a second scale-factor multiplication operation 109, a quantization operation 111, and an operation 113 for cost function selection, neural network training, quantization cell size optimization, and weight optimization.

The method of FIG. 1 includes selecting a neural network model, wherein the neural network model includes a plurality of layers. In an embodiment, a selector may be used to select the neural network model. Each of the plurality of layers may include weights and activations. The neural network model may be modified by inserting a plurality of quantization layers within the neural network model. In an embodiment, an insertion device may be used to insert the plurality of quantization layers. A cost function is associated with the modified neural network model, where the cost function includes a first coefficient corresponding to a first regularization term, and an initial value of the first coefficient is pre-defined. In an embodiment, an association device may be used to associate the cost function with the modified neural network model. The modified neural network model is trained to generate quantized weights for a layer by increasing the first coefficient until all weights are quantized and the first coefficient satisfies a pre-defined threshold, and optimizing a weight scaling factor for the quantized weights and an activation scaling factor for quantized activations, wherein the quantized weights are quantized using the optimized weight scaling factor. In an embodiment, a training device may be used to provide the training.

The weight scaling factor and the activation scaling factor may be optimized based on minimizing a minimum square quantization error (MSQE).

Each quantization layer of the plurality of quantization layers may be inserted after each activation output in each layer within the neural network model.

The cost function may include a second coefficient corresponding to a second regularization term based on the weight scaling factor and the activation scaling factor being power-of-two numbers.

The quantized weights, the weight scaling factor, and the activation scaling factor may be applied to a fixed-point neural network, where the fixed-point neural network includes a plurality of convolutional layers, where each of the plurality of convolutional layers includes a convolution operation configured to receive feature maps and the quantized weights. A bias addition operation may be configured to receive an output of the convolution operation and biases. A first multiplying operation may be configured to receive an output of the bias addition operation and the first scale factor. An activation operation may be configured to receive an output of the first multiplier operation. A second multiplying operation may be configured to receive an output of the activation operation and the second scale factor, and a quantization operation may be configured to receive an output of the second multiplying operation.

The neural network may be trained by updating the weights by a stochastic gradient descent method; updating the weight scaling factor by the stochastic gradient descent method; updating the activation scaling factor by the stochastic gradient descent method; if the weight scaling factor and the activation scaling factor are of a power of two, including additional gradients of the stochastic descent method; updating the regularization coefficients by the stochastic gradient descent method; and terminating the training if either the regularization coefficient is greater than a pre-determined constant or a number of iterations of the method is greater than a predetermined limit.

The weights may be fixed-point weights. The first scale factor may be a product of the weight scaling factor and the activation scaling factor. The activation operation may be a non-linear activation function.

The quantized weights, the weight scaling factor, and the activation scaling factor may be applied to a fixed-point neural network, where the fixed-point neural network includes a plurality of convolutional layers, and where each of the plurality of convolutional layers includes a convolution operation configured to receive feature maps and the quantized weights. A bias addition operation may be configured to receive an output of the convolution operation and biases. A rectified linear unit (ReLU) activation operation may be configured to receive an output of the bias addition operation. A scale-factor multiplying operation may be configured to receive an output of the ReLU activation operation and a scale factor, and a quantization operation may be configured to receive an output of the scale-factor multiplying operation.

The scale factor may be a product of the weight scale factor and the quantization scale factor.

The convolution operation 101 receives a feature map (e.g., a fixed-point (FXP) input) and fixed-point weights (e.g., FXP weights). In one embodiment, the convolution operation 101 is implemented with low-precision fixed-point multipliers and accumulators.

The output of the convolution operation 101 and biases are received and summed by the bias addition operation 103.

The fixed-point weights and input feature maps may be scaled by a weight scaling factor $\delta_l$ and an input feature map scaling factor $\Delta_{l-1}$ for layer l. For example, the output of the bias addition operation 103 may be scaled by a product of the weight scaling factor $\delta_l$ and the input feature map scaling factor $\Delta_{l-1}$ (e.g., $\Delta_{l-1}\delta_l$) by the first scale-factor multiplication operation 105 receiving the output of the bias addition operation 103 and the scaling factor $\Delta_{l-1}\delta_l$, and generating a product from the same. In one embodiment, scaling of the output of the bias addition operation 103 may be avoided by scaling the biases by the scaling factor $\Delta_{l-1}\delta_l$.

The output of the first scale-factor multiplication operation 105 is received by the first non-linear activation operation 107.

The output of the non-linear activation operation 107 is scaled by a scaling factor scaling factor $1/\Delta_l$. For example, the second scale-factor multiplication operation 109 receives the output of the activation operation 107 and a scaling factor (e.g., $1/\Delta_l$) and generates a product of the same.

The output of the second scale-factor multiplication operation 109 is quantized by the quantization operation 111 (e.g., FXP output).

The operation 113 selects a cost function, trains the neural network, optimizes quantization cell size, and optimizes weights.

Figure 2:
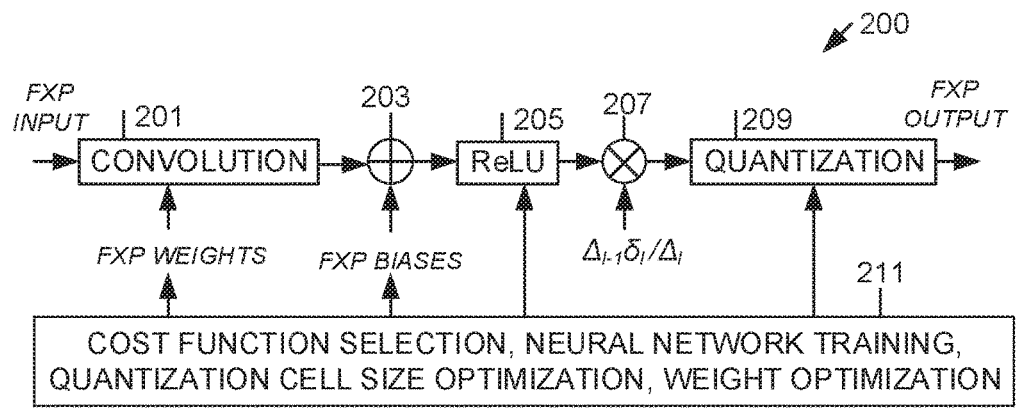
FIG. 2 illustrates an exemplary flow diagram of a method of a low-precision convolutional layer for an ReLU activation function that combines weight quantization and activation quantization, according to an embodiment of the present disclosure.

FIG. 2 illustrates an exemplary flow diagram of a method of a low-precision convolutional layer 200 for an ReLU activation function that combines weight quantization and activation quantization, according to an embodiment of the present disclosure.

Referring to FIG. 2, the low-precision convolutional layer 200 includes a convolution operation 201, a bias addition operation 203, an ReLU operation 205, a scale-factor multiplication operation 207, a quantization operation 209, and an operation 211 for cost function selection, neural network training, quantization cell size optimization, and weight optimization.

The convolution operation 201 receives a feature map (e.g., FXP input) and fixed-point weights (e.g., FXP weights). In one embodiment, the convolution operation 201 is implemented with low-precision fixed-point multipliers and accumulators.

The output of the convolution operation 201 and biases are received and summed by the bias addition operation 203.

The output of the bias addition operation 203 is received by the ReLU operation 205.

The fixed-point weights and input feature maps may be scaled by scaling factors $\delta_l$ and $\Delta_{l-1}$, respectively, for layer l. For example, the output of the ReLU operation 205 may be scaled by a product of the weight scaling factor $\delta_l$ and the input feature map scaling factor $\Delta_{l-1}$ divided by $\Delta_l$ (e.g., $(\Delta_{l-1}\delta_l)/\Delta_l$) by the scale-factor multiplication operation 207 receiving the output of the ReLU operation 205 and the scaling factor $\Delta_{l-1}\delta_l)/\Delta_l$, and generating a product from the same. That is, the two scaling operations shown in FIG. 1 are combined into one in FIG. 2. If the scaling factors are power-of-two numbers, then scaling may be implemented by bit shift. Similarly, fully-connected layers may be implemented by replacing convolution with simple matrix multiplication.

The output of the scale-factor multiplication operation 207 is quantized by the quantization operation 209 (e.g., FXP input).

The operation 211 selects a cost function, trains the neural network, optimizes quantization cell size, and optimizes weights.

In a low-precision neural network, bit widths for weights and activations may be provided and fixed. Scaling factors for fixed-point weights and activations may be selected. While determining optimum scaling factors, the present system optimizes low-precision fixed-point weights. According to one embodiment, the present system and method learns the quantization parameters and quantized fixed-point weights simultaneously.

According to one embodiment, the present system and method provides low-precision neural network quantization including weight quantization and activation quantization.

A quantization function may be defined. The number of bits used to represent each quantized value may be provided. For a bit width n, where n is an integer, the quantization function output is as in Equation (1) as follows:

$$Q_n(x;\delta)=\delta \cdot \text{clip}(\text{round}(2/\delta),[-2^{n-1},2^{n-1}-1]), \quad (1)$$

where x is an input and $\delta$ is a quantization cell size (e.g., a common scaling factor); and the rounding and clipping functions are as in Equations (2) and (3) as follows:

$$\text{round}(x)=\text{sign}(x)\lfloor |x|+0.5 \rfloor \quad (2)$$

$$\text{clip}(x,[a,b])=\min(\max(x,a),b) \quad (3)$$

where x, a, and b are inputs.

For a general non-linear neural network having L layers, $W_1, W_2, \ldots, W_L$ are sets of weights in layers 1 to L, respectively, where L is an integer. For notational simplicity, Equation (4) is as follows:

$$A_1^L = A_1, A_2, \ldots, A_L, \quad (4)$$

for any symbol A. For weight quantization, the present system provides a regularization term of the average of the MSQEs for weights in all L layers, i.e., as in Equation (5) as follows:

$$R_n(W_1^L; \delta_1^L) = \frac{1}{N}\sum_{l=1}^{L}\sum_{w \in W_l} |w - Q_n(w; \delta_l)|^2, \quad (5)$$

where n is the bit width for low-precision weights, $\delta_l$ is the quantization cell size, i.e., the common scaling factor, for weights in layer l, and N is the total number of weights in all L layers, i.e., $N=\sum_{l=1}^{L}|W_1^L|$.

According to one embodiment, the present system provides a learnable regularization coefficient to obtain quantized weights gradually using the above MSQE regularization. The regularization coefficient may be another learnable parameter. Starting from a small regularization coefficient (e.g., a pre-defined regularization coefficient), the present system learns a high-precision model with little performance loss. As training continues, the present system increases the regularization coefficient until there are quantized weights at the completion of training. An additional penalty term for a small regularization coefficient is included, e.g., $-\log \alpha$, where $\alpha$ is the regularization coefficient. The cost function for weight quantization is as in Equation (6) as follows:

$$C(X,W_1^L,\delta_1^L,\alpha)=L(X;W_1^L)+\alpha R_n(W_1^L;\delta_1^L)-\lambda \log \alpha \quad (6)$$

where $L(X; W_1^L)$ is the original network loss function for training dataset X, and where A is a hyper-parameter that is selected and fixed for training.

The present system optimizes the cost function in network training and updates weights, quantization cell sizes, and the learnable regularization coefficient. Because of the penalty term on a small value of $\alpha$, i.e., $-\log \alpha$, where $\alpha$ causes the importance of the regularization term $R_n$ to increase continuously during training, which causes the regularization for weight quantization to increase, and causes the weights to be quantized by the completion of training. The regularization coefficient increases gradually so long as the network loss function does not significantly degrade.

For activation quantization, the present system provides quantization layers. For an original full-precision model, quantization layers for activations are inserted wherever needed to quantize activations for a low-precision model, e.g., after every activation function. The present system may insert quantization layers after every existing layer from 1 to L. For an activation x from layer l, the quantization layer outputs $Q_m(x; \Delta_l)$, where $Q_m$ is the quantization function for bit width m and $\Delta_l$ is the learnable quantization cell size (e.g., common scaling factor) for output activations of layer l.

The present system optimizes $\Delta_l$ by minimizing MSQE for the output activations of layer l as in Equation (7) as follows:

$$S_m(X_l; \Delta_l) = \frac{1}{|X_l|}\sum_{x \in X_l}|x - Q_m(x; \Delta_l)|^2, \quad (7)$$

where $X_l$ is the set of output activation values of layer l for $1 \leq l \leq L$. Moreover, l may include l=0 by assuming that a quantization layer is inserted immediately before the first layer to quantize the network input, i.e., where $X_0$ is the set of network input values and $\Delta_0$ is the quantization cell size for the network input.

Quantization layers are activated in training to generate quantized activations so that weights are optimized for quantized activations. In contrast, the weight quantization method does not actually quantize weights all at once during training. Weights are quantized gradually during training, where each weight gradually converges to a quantized value as training proceeds due to the MSQE regularization with increasing regularization coefficient.

Power-of-two quantization cell sizes (e.g., common scaling factors) provide benefit in computation when implemented by bit shift rather than scalar multiplication. An additional regularization term may be introduced as in Equation (8) follows:

$$T(\delta_1^L) = \frac{1}{L}\sum_{l=1}^{L} |\delta_l - \text{round}_{pow2}(\delta_l)|^2, \quad (8)$$

where $\text{round}_{pow2}$ is a rounding function that rounds to the closest power-of-two value, i.e., as in Equation (9) as follows:

$$\text{round}_{pow2}(x) = 2^{\lfloor \log_2 |x| \rfloor} \cdot \text{round}\left(\frac{x}{2^{\lfloor \log_2 |x| \rfloor}}\right) \quad (9)$$

Using a learnable regularization coefficient, the present system converges the quantization cell sizes gradually to optimal power-of-two values during training. For example, weight quantization with power-of-two quantization cell sizes may be obtained by optimizing the cost function of Equation (10) as follows:

$$C_{pow2}(X, W_1^L, \delta_1^L, \alpha, \beta) = L(X; W_1^L) + \alpha R_n(W_1^L; \delta_1^L) - \lambda \log \alpha + \beta T(\delta_1^L) - \zeta \log \beta \quad (10)$$

where $\lambda$ and $\zeta$ are hyper-parameters that are selected and fixed for training. Similarly, activation quantization cell sizes can be regularized to power-of-two numbers by $$T(\Delta_0^L) = \frac{1}{L+1} \sum_{l=0}^{L} |\Delta_l - \text{round}_{pow2}(\Delta_l)|^2.$$

Figure 3:
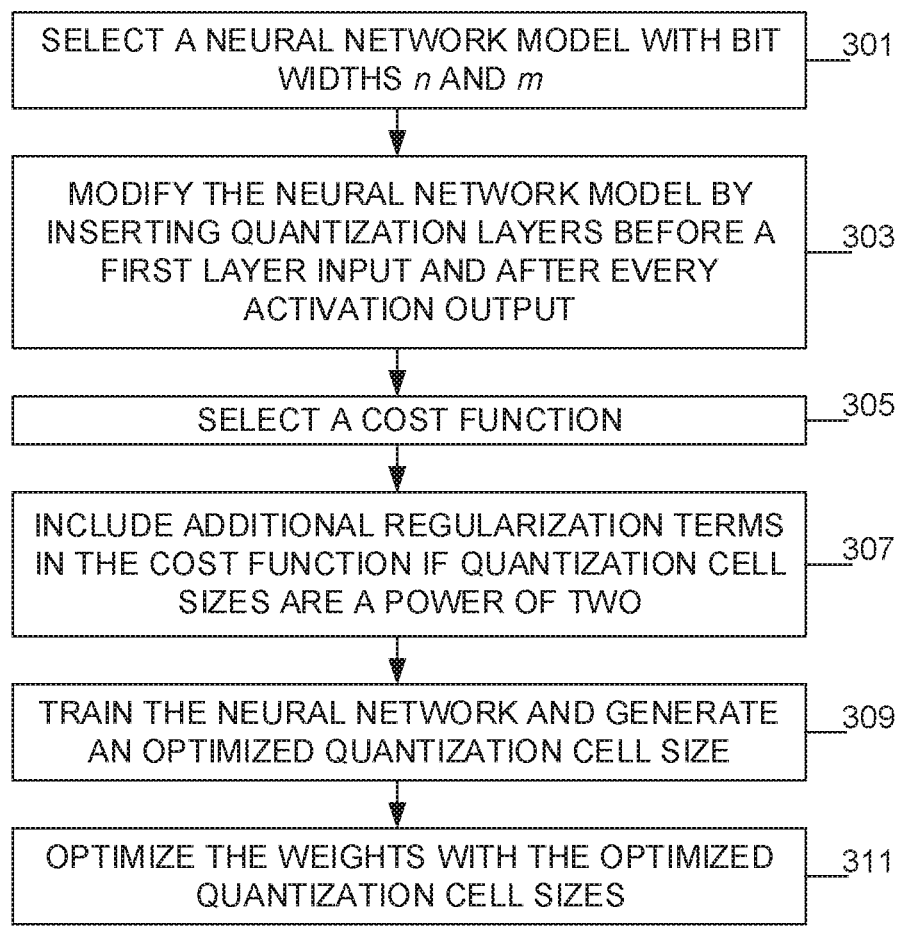
FIG. 3 illustrates an exemplary a flowchart of a method of quantizing weights and quantizing an activation for a low-precision neural network, according to an embodiment of the present disclosure.

FIG. 3 illustrates an exemplary flowchart of a method of quantizing weights and quantizing an activation for a low-precision neural network, according to an embodiment of the present disclosure.

Referring to FIG. 3, at 301, the present system selects a neural network model with bit widths n and m, where n and m are integers. A quantization method for low-precision neural networks includes selecting an original neural network model, with bit widths n and m for low-precision weights and activations, respectively (e.g., the bit widths may be different for different layers or fixed for all layers).

At 303, the present system modifies the selected neural network model by inserting quantization layers. For example, a quantization layer is inserted after every activation output and before the first layer input.

At 305, the present system selects a cost function. For example, a cost function is as in Equation (11) as follows:

$$C(X, W_1^L, \delta_1^L, \Delta_0^L, \alpha) = L(X; W_1^L) + \alpha R_n(W_1^L; \delta_1^L) - \lambda \log \alpha + \eta \Sigma_{l=0}^{L} S_m(X_l; \Delta_l) \quad (11)$$

where $\lambda$ and $\eta$ are hyper parameters selected and fixed prior to training.

At 307, the present system includes additional regularization terms in the cost function if quantization cell sizes are a power of two, as in Equation (12) as follows:

$$C_{pow2}(X, W_1^L, \delta_1^L, \Delta_0^L, \alpha, \beta_1^2) = C(X, W_1^L, \delta_1^L, \Delta_0^L, \alpha) + \beta_1 T(\delta_1^L) + \beta_2 T(\Delta_0^L) - \zeta_1 \log \beta_1 - \zeta_2 \log \beta_2, \quad (12)$$

where and $\zeta_1$ and $\zeta_2$ are hyper parameters selected and fixed prior to training.

At 309, the present system trains the network to generate an optimized quantization sell size.

At 311, the present system optimizes the weights with the optimized quantization cell sizes. After training is terminated, the present system may quantize trained weights with the optimized quantization cell sizes $\delta_1^L$, since the trained weights at the termination of training are quantized but still in high-precision. The loss from 311 may be negligible as long as the weight quantization is successful and a becomes sufficiently large.

Figure 4:
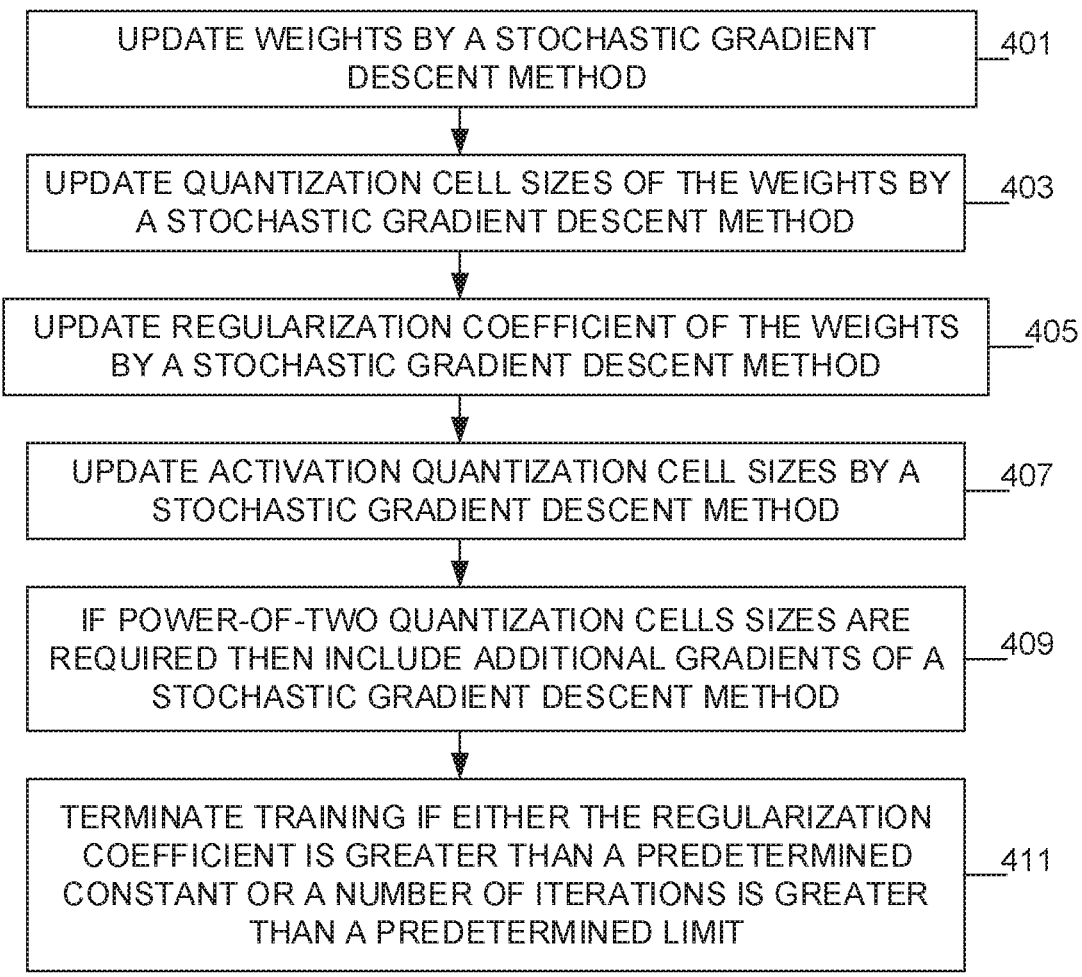
FIG. 4 illustrates an exemplary flowchart of a method of training a low-precision neural network that combines weight quantization and activation quantization, according to an embodiment of the present disclosure.

FIG. 4 illustrates an exemplary flowchart of a method of training a low-precision neural network that combines weight quantization and activation quantization, according to an embodiment of the present disclosure. According to one embodiment, FIG. 4 may be an implemented as represented by 309 of FIG. 3.

Using stochastic gradient descent with mini-batches, every learnable parameter p (e.g., weights, quantization cell sizes, regularization coefficients) is updated by one of stochastic gradient descent methods, e.g., as in Equation (13) as follows:

$$p[t] = p[t-1] - \eta \frac{\partial C}{\partial p}, \quad (13)$$

Referring to FIG. 4, at 401, the present system updates weights in $W_1^L$ using gradients as in Equation (14) as follows:

$$\frac{\partial C}{\partial w} = \frac{\partial L}{\partial w} + \alpha \frac{\partial R_n}{\partial w} = \frac{\partial L}{\partial w} + \alpha \frac{2}{N}(w - Q_n(w; \delta_l)) 1_{w \notin B_n(\delta_l)}, \quad (14)$$

where $B_n(\delta_l)$ is the set of linear quantization cell boundaries, i.e., as in Equation (15) as follows:

$$B_n(\delta_l) = \left\{ \left(\frac{-2^n + 1}{2} + i\right)\delta_l, i = 0, 1, \ldots, 2^n - 2 \right\} \quad (15)$$

The first term $\partial L / \partial w$ may be obtained from a back propagation method.

At 403, the present system updates weight quantization cell sizes $\delta_l^L$ using gradients of Equation (16) as follows:

$$\frac{\partial C}{\partial \delta_l} = \alpha \frac{\partial R_n}{\partial \delta_l} = -\alpha \frac{2}{N} \sum_{w \in W_l} (w - Q_n(w; \delta_l)) \frac{Q_n(w; \delta_l)}{\delta_l} 1_{w \notin B_n(\delta_l)}, \quad (16)$$

$$\text{where } \frac{Q_n(w; \delta_l)}{\delta_l} = \text{clip}(\text{round}(w/\delta_l), [-2^{n-1}, 2^{n-1} - 1]).$$

At 405, the present system updates the weight regularization coefficient $\alpha$. Instead of directly updating $\alpha$, the present system updates $\gamma = \log \alpha$ using the gradient as in Equation (17) as follows:

$$\frac{\partial C}{\partial \gamma} = e^\gamma R_n(W_1^L; \delta_1^L) - \lambda. \quad (17)$$

At 407, the present system updates activation quantization cell sizes $\Delta_0^L$ using gradients of Equation (18) as follows:

$$\frac{\partial C}{\partial \Delta_l} = \eta \frac{\partial S_m}{\partial \Delta_l} = -\eta \frac{2}{|X_l|} \sum_{w \in W_l} (w - Q_m(w; \Delta_l)) \frac{Q_m(x; \Delta_l)}{\Delta_l} 1_{x \notin B_m(\Delta_l)}, \quad (18)$$

$$\text{where } \frac{Q_m(w; \Delta_l)}{\Delta_l} = \text{clip}(\text{round}(x/\Delta_l), [-2^{m-1}, 2^{m-1} - 1]).$$

At 409, if power-of-two quantization cell sizes are needed, additional gradients are included as in Equations (19) and (20) as follows:

$$\frac{\partial C_{pow2}}{\partial \delta_l} = \frac{\partial C}{\partial \delta_l} + \beta_1 \frac{2}{L}(\delta_l - \text{round}_{pow2}(\delta_l)), \quad (19)$$

-continued $$\frac{\partial C_{pow2}}{\partial \Delta_l} = \frac{\partial C}{\partial \Delta_l} + \beta_2 \frac{2}{L+1}(\Delta_l - \text{round}_{pow2}(\Delta_l)). \quad (20)$$

During training, $\omega_1 = \log \beta_1$ and $\omega_2 = \log \beta_2$ are updated using gradients of Equations (21) and (22) as follows:

$$\frac{\partial C_{pow2}}{\partial \omega_1} = e^{\omega_1} T(\delta_1^L) - \zeta_1, \quad (21)$$

$$\frac{\partial C_{pow2}}{\partial \omega_2} = e^{\omega_2} T(\Delta_0^L) - \zeta_2. \quad (22)$$

At 411, if $\alpha > A$ for a sufficiently large and predetermined constant A or the number of iterations is greater than a predetermined number then training is terminated.

In order to enable backpropagation through quantization layers, the present system uses a straight-through estimator that passes the gradient from an upper layer to a lower layer, when the input is within the clipping boundary. Outside the clipping boundary, the gradient is determined to be zero. Stochastic rounding may be employed instead of deterministic rounding in quantization for better convergence.

Additional computation for gradients is not expensive, and the additional complexity only grows in O(N), where N is the number of weights. Thus, the method described above is applicable to deep neural networks with millions or tens of millions of parameters.

According to one embodiment, the method of weight quantization may be extended to include weight pruning. That is, for a threshold θ, a function for both weight quantization and weight pruning may be defined as in Equation (23) as follows:

$$Q_n^{Pruning+Quantization}(x; \delta, \theta) = \quad (23)$$
$$\begin{cases} 0 & , |x| < \theta, \\ \delta \cdot \text{clip}(\text{round}(2/\delta), [-2^{n-1}, 2^{n-1} - 1]) & , \text{otherwise.} \end{cases}$$

Equation (23) above outputs zero if the input is less than the threshold θ. Otherwise, Equation (23) outputs a quantized value of the input. Then, in order to achieve weight pruning in addition to weight quantization, the weight regularization in Equation (5) above is modified as in Equation (24) as follows:

$$R_n^{Pruning+Quantization}(W_1^L; \delta_1^L) = \quad (24)$$
$$\frac{1}{N} \sum_{l=1}^{L} \sum_{w \in W_l} |w - Q_n^{Pruning+Quantization}(w; \delta_l, \theta_l)|^2,$$

where $\theta_l$ is either a pre-determined constant or a function of the weight values in each training iteration.

For example, for a target weight pruning rate $r_l$ in each layer l, the threshold $\theta_l$ may be obtained from the r-th percentile of the absolute values for weights in each layer, which may be updated in each training iteration. The regularization then forces the weights below the threshold $\theta_l$ towards zero while other weights are quantized to their closest cell centers. The quantized low-precision weights may be further compressed in size by variable-rate coding, e.g., Huffman coding or arithmetic coding.

For example, for weight pruning, a pruning function may be as in Equation (25) as follows:

$$P(x; \theta) = \begin{cases} 0 & , |x| < \theta, \\ x & , \text{otherwise.} \end{cases} \quad (25)$$

The weight pruning regularization term may be as in Equation (26) as follows:

$$R^{Pruning}(W_1^L) = \frac{1}{N} \sum_{l=1}^{L} \sum_{w \in W_l} |w - P(w; \theta_l)|^2, \quad (26)$$

where $\theta_l$ is either a pre-determined constant or a function of the weight values in each training iteration.

Similarly in Equation (24) above, for a target weight pruning rate $r_l$ in each layer 1, the threshold $\theta_l$ may be obtained from the r-th percentile of the absolute values of weight in each layer, and the threshold $\theta_l$ may be updated in each training iteration. The regularization then causes the weights below the threshold $\theta_l$ to move towards zero.

According to one embodiment, the present system provides low-precision neural networks having quantized weights and feature maps. For example, quantized weights and feature maps are represented by fixed-point numbers of low-precision assuming that common scaling factors (i.e., fixed quantization cell sizes) are applied for weights and feature maps in each layer, respectively. Due to fixed-point weights and feature maps of low-precision, the present system lowers storage/memory requirements reduces computational costs; fixed-point arithmetic operations may be used instead of full-precision floating-point arithmetic operations.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
   selecting a neural network model, wherein the neural network model includes a plurality of layers, and wherein each of the plurality of layers includes weights and activations;
   modifying the neural network model by inserting a plurality of quantization layers within the neural network model;
   associating a cost function with the modified neural network model, wherein the cost function includes a first coefficient corresponding to a first regularization term, and wherein an initial value of the first coefficient is pre-defined; and
   training the modified neural network model to generate quantized weights for a layer by increasing the first coefficient until all weights are quantized and the first coefficient satisfies a pre-defined threshold, further including optimizing a weight scaling factor for the quantized weights and an activation scaling factor for quantized activations, and wherein the quantized weights are quantized using the optimized weight scaling factor.

2. The method of claim 1, further comprising optimizing the weight scaling factor and the activation scaling factor based on minimizing a mean square quantization error (MSQE).

3. The method of claim 1, further comprising inserting each quantization layer of the plurality of quantization layers after each activation output in each layer within the neural network model.

4. The method of claim 1, wherein the cost function includes a second coefficient corresponding to a second regularization term based on the weight scaling factor and the activation scaling factor being power-of-two numbers.

5. The method of claim 1, further comprising applying the quantized weights, the weight scaling factor, and the activation scaling factor to a fixed-point neural network, wherein the fixed-point neural network includes a plurality of convolutional layers,
  wherein each of the plurality of convolutional layers includes a convolution operation configured to perform convolution on feature maps and the quantized weights,
  a bias addition operation configured to perform addition on an output of the convolution operation and biases,
  a first multiplying operation configured to perform multiplication on an output of the bias addition operation and a first scale factor,
  an activation operation configured to apply an activation function to an output of the first multiplying operation,
  a second multiplying operation configured to perform multiplication on an output of the activation operation and a second scale factor, and
  a quantization operation configured to quantize an output of the second multiplying operation.

6. The method of claim 5, wherein the weights are fixed-point weights.

7. The method of claim 5, wherein the first scale factor is a product of the weight scaling factor and the activation scaling factor.

8. The method of claim 5, wherein the activation operation is a non-linear activation function.

9. The method of claim 1, wherein training the neural network comprises:
  updating the weights by a stochastic gradient descent method;
  updating the weight scaling factor by the stochastic gradient descent method;
  updating the activation scaling factor by the stochastic gradient descent method;
  if the weight scaling factor and the activation scaling factor are of a power of two, including additional gradients of the stochastic descent method;
  updating regularization coefficients by the stochastic gradient descent method; and
  terminating the training if either the regularization coefficient is greater than a pre-determined constant or a number of iterations of the method is greater than a predetermined limit.

10. The method of claim 1, further comprising applying the quantized weights, the weight scaling factor, and the activation scaling factor to a fixed-point neural network, wherein the fixed-point neural network includes a plurality of convolutional layers,
  wherein each of the plurality of convolutional layers includes a convolution operation configured to perform convolution on feature maps and the quantized weights,
  a bias addition operation configured to perform addition on an output of the convolution operation and biases,
  a rectified linear unit (ReLU) activation operation configured to apply an ReLU activation function to an output of the bias addition operation,
  a scale-factor multiplying operation configured to perform multiplication on an output of the ReLU activation operation and a scale factor, and
  a quantization operation configured to quantize an output of the scale-factor multiplying operation.

11. The method of claim 10, wherein the scale factor is a product of a weight scale factor and a quantization scale factor.

12. An apparatus, comprising:
  a memory storing instructions; and
  a processor,
  wherein the processor is configured to execute the instructions causing the processor to:
  select a neural network model, wherein the neural network model includes a plurality of layers, and wherein each of the plurality of layers includes weights and activations;
  modify the neural network model by inserting a plurality of quantization layers within the neural network model;
  associate a cost function with the modified neural network model, wherein the cost function includes a first coefficient corresponding to a first regularization term, and wherein an initial value of the first coefficient is pre-defined; and
  train the modified neural network model to generate quantized weights for a layer by increasing the first coefficient until all weights are quantized and the first coefficient satisfies a pre-defined threshold, and optimize a weight scaling factor for the quantized weights and an activation scaling factor for quantized activations, wherein the quantized weights are quantized using the optimized weight scaling factor.

13. The apparatus of claim 12, wherein the processor is further configured to execute the instructions to optimize the weight scaling factor and the activation scaling factor based on minimizing a mean square quantization error (MSQE).

14. The apparatus of claim 12, wherein the processor is further configured to execute the instructions to insert each quantization layer of the plurality of quantization layers after each activation output in each layer within the neural network model.

15. The apparatus of claim 12, wherein the cost function includes a second coefficient corresponding to a second regularization term based on the weight scaling factor and the activation scaling factor being power-of-two numbers.

16. The apparatus of claim 12, wherein the neural network model is a fixed-point neural network to which the quantized weights, the weight scaling factor, and the activation scaling factor are applied, wherein the fixed-point neural network includes a plurality of convolutional layers,
  wherein each of the plurality of convolutional layers is configured to perform a convolution operation on feature maps and the quantized weights, and
  wherein the processor is further configured to execute the instructions to:
  perform addition on an output of the convolution operation and biases,
  perform multiplication on an output of the addition and a first scale factor,
  apply an activation function to an output of the first multiplication,
  perform multiplication on an output of the activation function and a second scale factor, and
  quantize an output of the second multiplication.

17. The apparatus of claim 16, wherein the weights are fixed-point weights.

18. The apparatus of claim 16, wherein the first scale factor is a product of the weight scaling factor and the activation scaling factor.

19. The apparatus of claim 12, wherein the processor is further configured to execute the instructions to:
update the weights by a stochastic gradient descent method;
update the weight scaling factor by the stochastic gradient descent method;
update the activation scaling factor by the stochastic gradient descent method;
if the weight scaling factor and the activation scaling factor are of a power of two, include additional gradients of the stochastic descent method;
update regularization coefficients by the stochastic gradient descent method; and
terminate the training if either the regularization coefficient is greater than a pre-determined constant or a number of iterations is greater than a predetermined limit.

20. The apparatus of claim 12, wherein the neural network model is a fixed-point neural network to which is applied the quantized weights, the weight scaling factor, and the activation scaling factor, wherein the fixed-point neural network includes a plurality of convolutional devices,
wherein each of the plurality of convolutional devices is configured to perform convolution on feature maps and the quantized weights, and
wherein the processor is further configured to execute the instructions to:
perform addition on an output of each of the convolution devices and biases,
apply a rectified linear unit (ReLU) activation function to an output of the addition,
perform multiplication on an output of the ReLU activation function and a scale factor, and
quantize an output of the multiplication.

21. The apparatus of claim 20, wherein the scale factor is a product of a weight scale factor and a quantization scale factor.

* * * * *